United States Patent
Gotman et al.

(10) Patent No.: US 8,457,249 B2
(45) Date of Patent: Jun. 4, 2013

(54) METHOD AND APPARATUS FOR CREST FACTOR REDUCTION IN TELECOMMUNICATIONS SYSTEMS

(75) Inventors: Maxim Gotman, Kfar Saba (IL); Tal Oved, Modi'in (IL); Oren Matsrafi, Karkur (IL); Assaf Touboul, Natanya (IL)

(73) Assignee: Qualcomm Incorporated, San Diego, CA (US)

(*) Notice: Subject to any disclaimer, the term of this patent is extended or adjusted under 35 U.S.C. 154(b) by 108 days.

(21) Appl. No.: 13/088,364

(22) Filed: Apr. 17, 2011

(65) Prior Publication Data

US 2011/0255627 A1    Oct. 20, 2011

Related U.S. Application Data

(60) Provisional application No. 61/325,386, filed on Apr. 19, 2010.

(51) Int. Cl.
*H04K 1/02*    (2006.01)

(52) U.S. Cl.
USPC ............ 375/297; 375/299; 375/260; 375/267

(58) Field of Classification Search
USPC .................................. 375/297, 299, 260, 267
See application file for complete search history.

(56) References Cited

U.S. PATENT DOCUMENTS

| 7,313,373 | B1 * | 12/2007 | Laskharian et al. | ........ 455/127.1 |
| 2004/0203430 | A1 | 10/2004 | Morris | |
| 2005/0163248 | A1 * | 7/2005 | Berangi et al. | ................ 375/296 |
| 2008/0019453 | A1 * | 1/2008 | Zhao et al. | ..................... 375/260 |
| 2009/0291653 | A1 * | 11/2009 | Suzuki et al. | .............. 455/127.2 |

* cited by examiner

*Primary Examiner* — Kabir A Timory

(57) ABSTRACT

A method and device for reducing Peak-to-Average Power Ratio (PAPR) of a transmitted signal in a wireless telecommunication system utilizing CFR technique, the method including performing peak-windowed clipping of a transmitted signal using at least two cascaded clipping stages and individually configuring parameters for each clipping stage before performing the peak-windowed clipping.

24 Claims, 2 Drawing Sheets

METHOD AND APPARATUS FOR CREST FACTOR REDUCTION IN TELECOMMUNICATIONS SYSTEMS

FIELD OF THE INVENTION

The present invention relates to telecommunications systems, in general and, in particular, to a transmitter implementing the Crest-Factor Reduction (CFR) technique.

BACKGROUND OF THE INVENTION

In modern communications systems using CDMA or OFDM modulation schemes, the signal is not a constant envelope signal, which means higher linearity requirements for the power amplifier (PA). In a wideband code division multiple access (WCDMA) system, the downlink signal is a sum of signals intended for different users. If the independent constituent carriers are combined in a multicarrier system in the digital domain, the Peak-to-Average Power Ratio (PAPR) grows even further. OFDM systems are multicarrier by definition, therefore leading to high PAPR as well. In all the above cases, the composite signal is Gaussian distributed that leads to a high peak-to-average-power-ratio (PAPR). High linearity requirements lead to low power efficiency and, therefore, to high power consumption in the PA. Nevertheless, for cost efficient implementation, it is still beneficial to combine the carriers in the digital intermediate frequency (IF) domain. The PAPR of the combined signal must be reduced in order to achieve a good efficiency in the PA, implying that the signal amplitude must be limited to have lower peaks, e.g. by clipping the signal. Advanced clipping methods were recently developed. One of them, the peak windowing method, can be applied on GSM, WCDMA, and OFDM single and multicarrier transmissions.

The simplest way to reduce the PAPR is to literally clip the signal, but this significantly increases the out-of-band emissions. A different approach is to multiply large signal peaks with a certain window. Any window can be used, provided it has good spectral properties. Examples of suitable window functions are the Gaussian, cosine, Kaiser, Hanning, and Hamming windows.

The function of the 'simple' (not windowed) peak suppression can be expressed as follows:

$$s_c(n) = s(n)c(n)$$

where $s(n)$ is the original signal sample, $s_c(n)$ is the clipped sample, $c(n)$ is the clipping factor obeying $$c(n) = \begin{cases} 1, & |s(n)| \leq A \\ \dfrac{A}{|s(n)|}, & |s(n)| > A \end{cases} \quad (1)$$

with A being the maximum allowable amplitude of the signal.

Although (1) preserves the signal phase, abrupt amplitude changes appear in the clipped signal, causing significant out-of-band spectrum re-growth. To overcome this drawback, a somewhat graceful clipping of the signal amplitude is suggested by the peak-windowing approach, by replacing the clipping series $c(n)$ with a new one, $b(n)$, computed by:

$$b(n) = 1 - \sum_{k=n-N+1}^{n} [1 - c(k)] w(n-k) \quad (2)$$

where $w(n)$ is the chosen window function truncated to length N.

In practice, however, the peaks may often appear rather frequently in the signal time envelope; this leads to overlapping of windows surrounding closely located peaks and, therefore, to excessive clipping of the signal and, thus, to its unreasonable distortion.

One suggested remedy to this drawback is adding feedback to the circuit implementing (2), in order to predict and prevent unnecessary clipping. FIG. 1 is a diagram of such an improved circuit available in the prior art, utilizing windowing as Finite Impulse Response (FIR) filter and a protective feedback. While providing the desired improvement, the feedback portion breaks the simple structure of the FIR filter, which is well exploited in the industry, and generally is less suitable for a pipelined design supporting high sampling rates of the data.

SUMMARY OF THE INVENTION

The current invention provides a solution to the above drawback by chaining two or more original digital filter, preferably Finite Impulse Response (FIR)-only based peak-windowing blocks, with no feedback. This enables a simpler, fully pipelined design (which basically cascades identical simple hardware blocks). Using this multistage approach allows for gradual clipping of the signal, by taking care of the higher peaks first, in the early stages along the signal flow, and then of lower peaks on the later stages.

The invention provides a method for reducing peaks in a transmitted signal, the method including (1) performing calculation of a clipping function for every transmitted sample, (2) multiplying the original transmitted sample with the calculated coefficient (clipping function), repeating (1) and (2) two or more times, optionally using a different clipping function each time, and optionally filtering the samples to suppress the by-product out-of-band radiation after one or more clipping stages.

There is further provided, according to the invention, an efficient Look Up Table-based implementation of the clipping function above.

There is provided, according to the present invention, a method for reducing Peak-to-Average Power Ratio (PAPR) of a transmitted signal in a wireless telecommunication system utilizing Crest Factor Reduction (CFR) technique, the method including performing peak-windowed clipping of a transmitted signal using at least two cascaded clipping stages; individually configuring parameters for each clipping stage before said step of performing; and filtering the clipped signal to suppress unwanted out-of-band emissions after at least one clipping stage.

According to a preferred embodiment, the step of clipping includes computing $|s(n)|^2$ then using a Look Up Table (LUT) to compute $[1-c(n)]$. $|s(n)|^2$ may be computed by computing by a single complex multiplier (multiplying $s(n)$ by its conjugate $s^*(n)$) or a real multiplier and an adder (performing $[\text{inphase}(s(n))] \times [\text{inphase}(s(n))] + [\text{quadrature}(s(n))] \times [\text{quadrature}(s(n))]$).

There is further provided, according to the invention, a device for reducing Peak-to-Average Power Ratio (PAPR) of a signal transmitted over a wireless telecommunication system utilizing Crest Factor Reduction (CFR) technique, the device including at least two cascaded CFR units for performing peak-windowed clipping of a transmitted signal in at least two cascaded clipping stages; and a digital filter coupled after at least one of said CFR units.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a method and system for wireless telecommunications providing improved performance of the CFR technique. This is accomplished by applying multi-stage, gradual peak-windowed clipping of the transmitted signal followed by its filtering for out-of-band spectrum shaping. The current invention answers the drawbacks of the prior art by chaining two or more original digital filter-only based, peak-windowing blocks (with no feedback). Using this multistage approach, the the signal can be clipped gradually, by clipping the higher peaks first, in the early stages along the signal flow, and then the lower peaks on the later ones. In this way, the peaks are gradually 'diluted' in time, each stage sees fewer events of close peaks and, thus, window overlapping is avoided to a high degree, thus eliminating the need for a protective feedback circuit. An additional advantage of the multistage approach is its programmable flexibility: different signal schemes and combinations thereof in a multicarrier system may require different levels of clipping and window functions for optimized performance. In the current invention, it is provisioned that every stage can be individually configured or programmed to answer this requirement. The parameters of each clipping stage can be individually configured before performing peak-windowed clipping, where the parameters include at least A, the maximum allowed amplitude, w(n), the windowing function taps (filter coefficients), and h(i), the taps of the optional out-of-band digital filter; also, each stage can be bypassed. Additionally, some or all of the stages can be followed by a channel FIR filter for better suppression of the out-of-band emissions resulting from the clipping. Such filtering can be bypassed, for example, if initially the clipping wasn't too hard (i.e., to a relatively low PAPR level, where, as a side effect, spectrum re-growth is expected to occur to a large extent) and/or the transmit spectrum emission mask (according to the regulatory rulings) wasn't too stringent.

The conventional peak-windowing technique improves the CFR performance compared to the traditional polar clipping, like that described by (1). However, in practice, it could contain overlapped windows leading to much more clipping of the signal than necessary, thus introducing excessive noise to the signal. In the prior art, this is usually solved by introducing a feedback path to the original peak-windowing FIR-based circuit, thus complicating the overall design. However, according to the present invention, if the original peak-windowing circuit is cloned and cascaded (the output of one is the input of the next), a gradual and graceful clipping of the signal is achieved, peaks are diluted in time, and the need for the feedback is eliminated.

Figure 1:
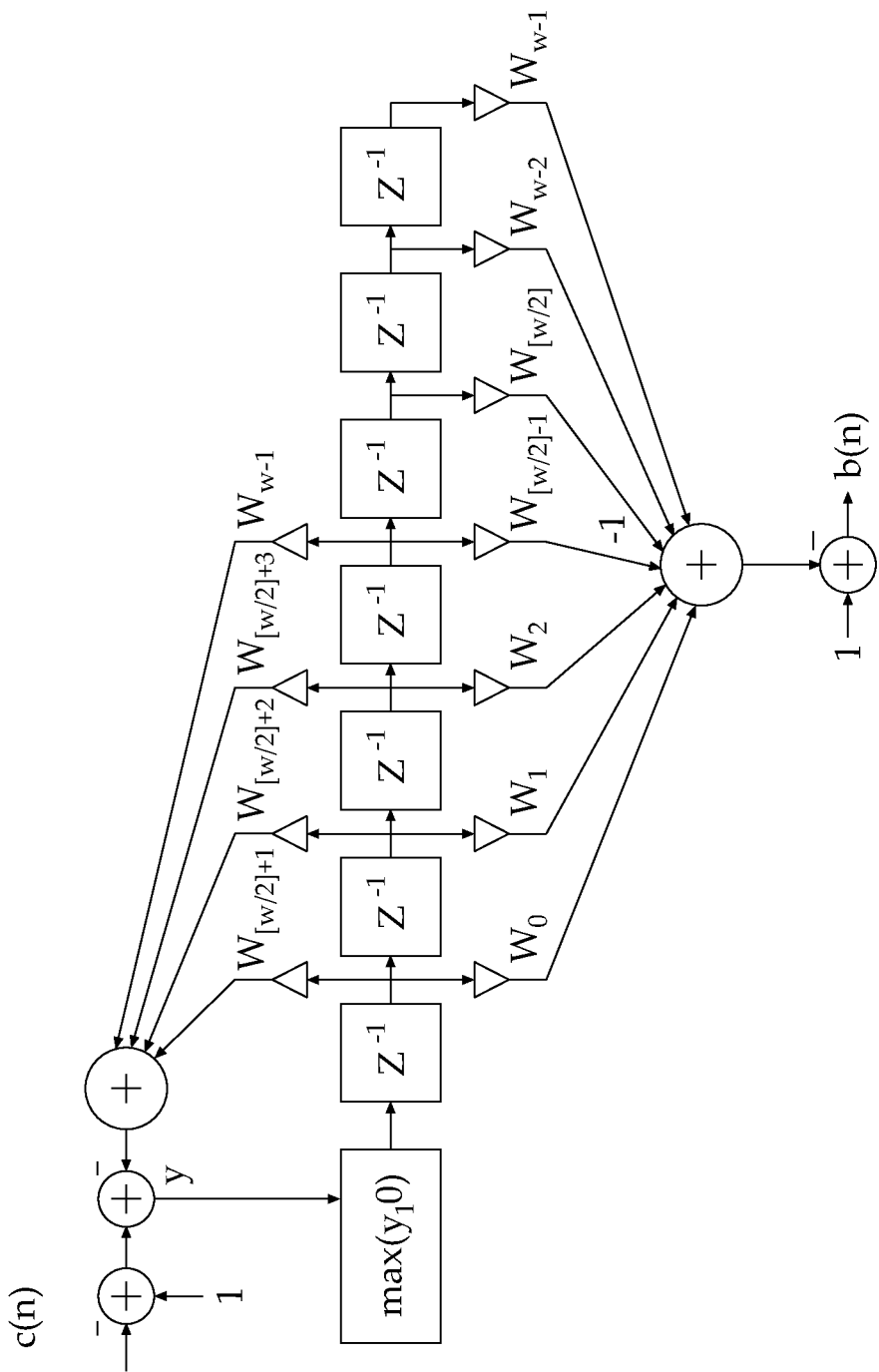
FIG. 1 is an architectural diagram illustration of a prior art peak-windowing method with feedback.
Figure 2:
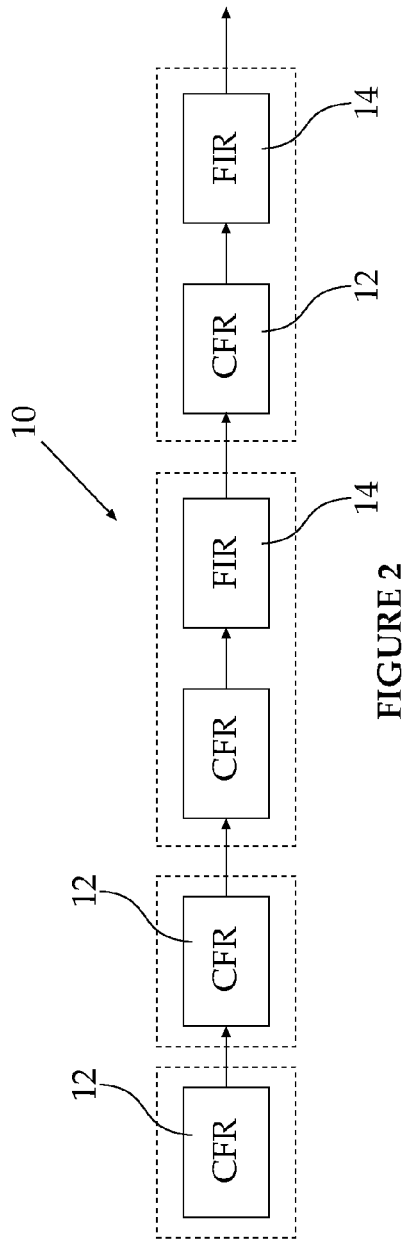
FIG. 2 is a general block diagram illustration of a multistage peak-windowed CFR (MSPW-CFR) cascade, constructed and operative according to one embodiment of the invention.

FIG. 2 is a block diagram illustration of MSPW-CFR according to some embodiments of the invention. FIG. 2 depicts a general block diagram for a 4-stage implementation 10 of the multistage CFR, when the 2 last stages are equipped with an optional channel filter. Each 'CFR' labeled block 12 designates a single instantiation (a concrete implementation by the logic (logical gates and wires)) of a peak-windowed CFR stage (a total of 4 stages, in this example), while the 'FIR'-labeled blocks 14 following the last 2 'CFR' stages stand for the out-of-band spectrum shaping filters. These digital filters are preferably Finite Impulse Response (FIR) filters, but alternatively any other digital filter can be utilized, including Infinite Impulse Response (IIR) filters.

Additionally, the current invention provides an efficient implementation to calculate c(n). Usually, there is a requirement to compute the absolute value $|s(n)|$ of every complex sample s(n), the variable in the calculation of c(n), which in practice requires either CORDIC (COordinate Rotation DIgital Computer)-based or hardware-squared-root to be employed. Neither of these is very well suited for pipelined implementation (as they usually employ iterative calculations). The current invention eliminates the need to compute $|s(n)|$ but only $|s(n)|^2$ instead, which is easily achieved by a single complex multiplier (multiplying s(n) by its conjugate s*(n)) or a real multiplier and an adder (performing [inphase (s(n))]'[inphase(s(n))]+[quadrature(s(n))]×[quadrature(s(n))]), then using a Look Up Table (LUT) to compute [1−c(n)] (i.e., storing pre-computed values of the clipping function [1−c(n)]), as explained in detail below. This LUT can be very small, since it only covers a limited dynamic range of the samples, namely only between the maximum allowed amplitude level A and the full-scale, a range normally not exceeding 8 dB (assuming, e.g., a full-scale PAPR of 14 dB before clipping and 6 dB PAPR corresponding to the threshold A).

Figure 3:
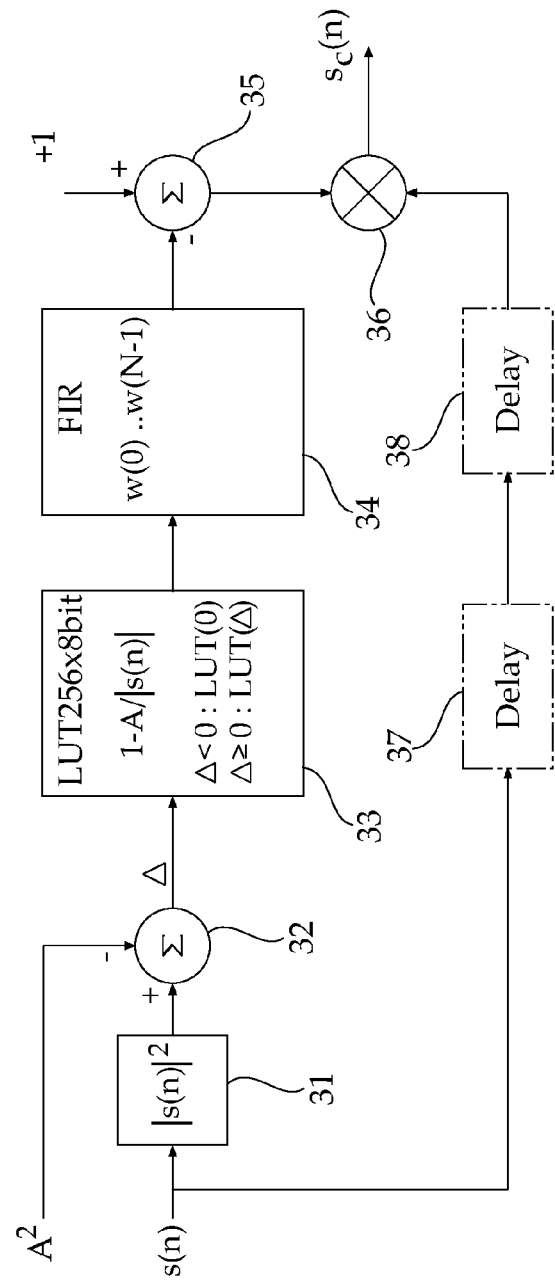
FIG. 3 is an architectural illustration of a circuit implementing a single stage of the MSPW-CFR, according to some embodiments of the invention.

Referring now to FIG. 3, there is shown a block diagram of the suggested efficient implementation of a single PW-CFR stage, according to preferred embodiments of the invention, (namely, implementing formula (2) to compute the clipping coefficients b(n), then performing the clipping itself by multiplying every sample s(i) with the corresponding b(i)). Time domain samples s(n) of the transmitted signal undergo computation of their squared amplitude $|s(n)|^2$ (block 31). The squared amplitude values are used then to calculate their difference Δ(n) from the squared maximum allowed amplitude $A^2$ preconfigured for the current stage, $\Delta(n)=|s(n)|^2-A^2$ (block 32), while negative values are clipped to zero (they correspond to the samples with a lower amplitude than the maximum allowed value and shouldn't be clipped). The differences are then quantized to a desired resolution (8 bits, in this example) and used to address the Look Up Table, LUT (block 33) implementing $[1-c(n)]=[1-A/|s(n)|]$. The LUT's output is then filtered by the stage's specifically preconfigured FIR filter (block 34) implementing the convolution with the window w(k). The process of computing b(n) according to (2) is completed then by block 35 by subtracting the filtered value from 1. Block 36 performs clipping of input sample s(n) with the corresponding coefficient b(n) resulting in the clipped sample $s_c(n)$. Delay block(s) 37 align the propagation of the sample s(n) with the computation delay of the corresponding b(n) inside the block.

While the invention has been described with respect to a limited number of embodiments, it will be appreciated that many variations, modifications and other applications of the invention may be made. It will further be appreciated that the The invention is not limited to what has been described hereinabove merely by way of example. Rather, the invention is limited solely by the claims which follow.

The invention claimed is:

1. A method for reducing a Peak-to-Average Power Ratio, PAPR, of a transmitted signal in a wireless telecommunication system utilizing Crest Factor Reduction, CFR, technique, the method comprising:
   receiving at each clipping stage in a plurality of cascaded clipping stages at least one complex sample associated with that clipping stage and based on the transmitted signal;
   computing at each clipping stage a Look Up Table (LUT) input based on a difference between a squared absolute value of said at least one complex sample and a squared maximum allowable amplitude individually configured for that clipping stage;
   providing at each clipping stage the LUT input computed for that clipping stage to a LUT in that clipping stage;
   filtering the output of said LUT to suppress out-of-band emissions after at least one of said clipping stages; and
   receiving a clipped signal based on an output of the LUT associated with a last clipping stage in said plurality of cascaded clipping stages.

2. The method according to claim 1, wherein each LUT of each clipping stage comprises a plurality of pre-computed values of a clipping function.

3. The method according to claim 1, wherein said computing said LUT input comprises:
   performing a complex multiplication of said complex sample with a complex conjugate of said complex sample to compute said squared absolute value of said at least one complex sample.

4. The method according to claim 1, further comprising:
   individually configuring one or both of said maximum allowed amplitude or a windowing function tap for each clipping stage prior to computing the LUT input at that clipping stage.

5. The method according to claim 4, wherein said filtering includes out-of band filtering and said method further comprises:
   individually configuring a tap of an out-of-band filter prior to said filtering.

6. The method according to claim 1, wherein each said clipping stage is individually configured to perform a different level of clipping.

7. The method according to claim 1, wherein said computing said LUT input comprises:
   computing a squared in-phase component and a squared quadrature component of said at least one complex signal with at least one real multiplier; and
   adding said squared in-phase component and said squared quadrature component with an adder to obtain said squared absolute value of said at least one complex sample.

8. The method of claim 1, wherein said filtering comprises filtering said output of said LUT with one or more of: a digital filter comprises a Finite Impulse Response (FIR) or an Infinite Impulse Response (IIR) filter.

9. A device for reducing Peak-to-Average Power Ratio (PAPR) of a signal transmitted over a wireless telecommunication system utilizing Crest Factor Reduction (CFR) technique, the device comprising:
   a clipping module comprising at least two cascaded CFR clipping stages for performing peak-windowed clipping of a transmitted signal, the clipping module configured to:
   receive at each CFR clipping stage at least one complex sample associated with that CFR clipping stage and based on the transmitted signal;
   compute at each CFR clipping stage a Look Up Table (LUT) input based on a difference between a squared absolute value of said at least one complex sample and a squared maximum allowable amplitude individually configured for that clipping stage;
   provide at each CFR clipping stage the LUT input computed for that CFR clipping stage to a LUT in that CFR clipping stage; and
   provide a clipped signal based on an output of the LUT associated with a last of the CFR clipping stages; and
   a digital filter coupled after at least one of said CFR clipping stages.

10. The device according to claim 9, wherein each said LUT comprises a plurality of pre-computed values of a clipping function for said peak-windowed clipping.

11. The device according to claim 9, wherein said digital filter comprises one or both of a Finite Impulse Response (FIR) or an Infinite Impulse Response (IIR) filter.

12. The device according to claim 9, wherein said clipping module is further configured to:
   perform a complex multiplication of said complex sample with a complex conjugate of said complex sample to compute said squared absolute value of said at least one complex sample.

13. The device according to claim 9, wherein one or both of said maximum allowed amplitude or a windowing function tap is individually configured for each clipping stage prior to computing the LUT input at that clipping stage.

14. The device according to claim 13, wherein said digital filter comprises an out-of band filtering and a tap of said out-of-band filter is individually configured for a particular stage prior to filtering.

15. The device according to claim 9, wherein said each said clipping stage is individually configured to perform a different level of clipping.

16. The device according to claim 9, wherein said clipping module is further configured to:
   compute a squared in-phase component and a squared quadrature component of said at least one complex signal with at least one real multiplier; and
   add said squared in-phase component and said squared quadrature component with an adder to obtain said squared absolute value of said at least one complex sample.

17. An apparatus for reducing a Peak-to-Average Power Ratio (PAPR) of a transmitted signal in a wireless communication system utilizing Crest Factor Reduction, CFR, the apparatus comprising:
   means for receiving at each clipping stage in a plurality of cascaded clipping stages at least one complex sample associated with that clipping stage and based on the transmitted signal;
   means for computing at each clipping stage a Look Up Table (LUT) input based on a difference between a squared absolute value of said at least one complex sample and a squared maximum allowable amplitude individually configured for that clipping stage;
   means for providing at each clipping stage the LUT input computed for that clipping stage to a LUT in that clipping stage;
   means for filtering the output of said LUT to suppress out-of-band emissions after at least one of the clipping stages; and means for receiving a clipped signal based on an output of the LUT associated with a last clipping stage in the set of cascaded clipping stages.

18. The apparatus according to claim 17, wherein each LUT of each clipping stage comprises a plurality of pre-computed values of a clipping function.

19. The apparatus according to claim 17, wherein said means for computing said LUT input comprises:
    means for performing a complex multiplication of said complex sample with a complex conjugate of said complex sample to compute said squared absolute value of said at least one complex sample.

20. The apparatus according to claim 17, further comprising:
    means for individually configuring one or both of said maximum allowed amplitude or a windowing function tap for each clipping stage prior to computing the LUT input at that clipping stage.

21. The apparatus according to claim 20, wherein said means for filtering comprises an out-of-band filter, said apparatus further comprising:
    means for individually configuring a tap of said out-of-band filter prior to said filtering.

22. The apparatus according to claim 17, wherein each said clipping stage is individually configured to perform a different level of clipping.

23. The apparatus according to claim 17, wherein said means for computing said LUT input comprises:
    means for computing a squared in-phase component and a squared quadrature component of said at least one complex signal with at least one real multiplier; and
    means for adding said squared in-phase component and said squared quadrature component with an adder to obtain said squared absolute value of said at least one complex sample.

24. The apparatus of claim 17, wherein said filtering comprises filtering said output of said LUT with one or more of: a digital filter comprises a Finite Impulse Response (FIR) or an Infinite Impulse Response (IIR) filter.

* * * * *